United States Patent
Gupta et al.

(10) Patent No.: US 9,877,285 B2
(45) Date of Patent: Jan. 23, 2018

(54) METHOD AND SYSTEM FOR DEVICE AWARE POWER SAVE

(71) Applicant: Aruba Networks Inc., Sunnyvale, CA (US)

(72) Inventors: Manoj Gupta, Santa Clara, CA (US); Gautam Bhanage, Sunnyvale, CA (US); Satish Kandekar, Sunnyvale, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 378 days.

(21) Appl. No.: 14/262,654

(22) Filed: Apr. 25, 2014

(65) Prior Publication Data
US 2015/0312861 A1    Oct. 29, 2015

(51) Int. Cl.
*H04W 52/02* (2009.01)

(52) U.S. Cl.
CPC ......... *H04W 52/0251* (2013.01); *Y02B 60/50* (2013.01)

(58) Field of Classification Search
CPC ......... H04W 52/0251; H04W 28/0278; H04W 88/08; H04W 52/00; H04W 52/0216; H04W 84/12; H04W 52/0219; H04W 28/14; H04W 74/06; H04W 24/02; H04W 72/1252; H04W 72/1284; H04W 28/06; H04W 28/18; Y02B 60/50; H04L 67/1095; H04L 12/2692; H04L 2012/5682; H04L 2012/6489; H04L 25/062; H04L 25/063; H04L 43/16; H04L 47/29; H04L 1/0021; H04L 12/2678; H04L 12/2681; H04L 12/403; H04L 12/423; H04L 43/10; H04L 43/103; H04L 47/30; H04L 47/10
See application file for complete search history.

(56) References Cited

U.S. PATENT DOCUMENTS

| | | | | |
|---|---|---|---|---|
| 7,974,299 B1 * | 7/2011 | Banerjea | ............... | H04L 47/122 370/431 |
| 8,023,522 B2 * | 9/2011 | Gobriel | ................... | H04L 12/12 370/311 |
| 8,971,229 B1 * | 3/2015 | Yenganti | ........... | H04W 52/0216 370/311 |
| 2004/0264396 A1 * | 12/2004 | Ginzburg | .......... | H04W 52/0232 370/311 |
| 2005/0135316 A1 * | 6/2005 | Cromer | ................. | H04L 47/767 370/338 |
| 2006/0262769 A1 * | 11/2006 | Ganz | ................. | H04W 72/1236 370/346 |
| 2012/0314635 A1 * | 12/2012 | Lee | ......................... | H04L 5/001 370/311 |

(Continued)

*Primary Examiner* — Paul H Masur
*Assistant Examiner* — Michael Phillips
(74) *Attorney, Agent, or Firm* — Hewlett Packard Enterprise Patent Department (57) ABSTRACT

A non-transitory computer readable medium includes instructions. The instructions, when executed by one or more hardware processors, causes performance of operations including receiving, at an access point, data targeted for a device, and determining whether an amount of the data targeted for the device is above a threshold. The operations further include, responsive at least to determining that the amount of data is below the threshold, transmitting a notification frame falsely indicating that the access point does not have the data targeted for the device.

22 Claims, 4 Drawing Sheets

(56) References Cited

U.S. PATENT DOCUMENTS

| | | | | |
|---|---|---|---|---|
| 2013/0051293 A1* | 2/2013 | Wentink | ............ | H04W 52/0216 370/311 |
| 2013/0143606 A1* | 6/2013 | Merlin | .............. | H04W 52/0209 455/458 |
| 2013/0157718 A1* | 6/2013 | Johanson, III | ........ | H04W 88/02 455/556.1 |
| 2013/0223306 A1* | 8/2013 | Jin | .................... | H04W 52/0235 370/311 |
| 2013/0223419 A1* | 8/2013 | Ghosh | ............... | H04W 52/0235 370/338 |
| 2013/0235813 A1* | 9/2013 | Segev | ................. | H04W 72/044 370/329 |
| 2013/0303202 A1* | 11/2013 | Jafarian | ................ | H04W 68/00 455/458 |
| 2013/0336113 A1* | 12/2013 | Okuyama | ........... | H04W 28/044 370/230.1 |
| 2014/0068621 A1* | 3/2014 | Sitaraman | ............... | G06F 9/505 718/102 |
| 2014/0105037 A1* | 4/2014 | Manthiramoorthy | . | H04W 4/008 370/252 |
| 2014/0192716 A1* | 7/2014 | Pantelidou | ............ | H04W 28/02 370/328 |
| 2015/0023245 A1* | 1/2015 | Du | .................... | H04W 28/0205 370/315 |
| 2015/0111610 A1* | 4/2015 | Hwang | ............. | H04W 72/1215 455/553.1 |
| 2015/0281980 A1* | 10/2015 | Zhou | .................... | H04W 24/02 370/254 |

\* cited by examiner

METHOD AND SYSTEM FOR DEVICE AWARE POWER SAVE

BACKGROUND

Computer networks allow users to connect to other users and to various sources of content. For example, using a user's computing device, the user may receive information from a remote location. The information is sent by way of packets. In order to send and receive packets wirelessly, a computing device establishes a connection with an access point (AP) and directly transmits the packet to the AP or receives the packet from the AP.

OVERVIEW

In general, in one aspect, embodiments relate to a non-transitory computer readable medium that includes instructions. The instructions, when executed by one or more hardware processors, causes performance of operations including receiving, at an access point, data targeted for a device, and determining whether an amount of the data targeted for the device is above a threshold. The operations further include, responsive at least to determining that the amount of data is below the threshold, transmitting a notification frame falsely indicating that the access point does not have the data targeted for the device.

In general, in one aspect, embodiments relate to a system that includes an access point including a hardware processor. The system is configured to perform operations including receiving, at the access point, data targeted for a device, and determining whether an amount of the data targeted for the device is above a threshold. The operations further include, responsive at least to determining that the amount of data is below the threshold, transmitting a notification frame falsely indicating that the access point does not have the data targeted for the device.

Other aspects will be apparent from the following description and the appended claims.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments are directed to a method and system for device aware power save functionality by an access point. In particular, in one or more embodiments, a device notifies the access point of the device entering a power save mode. The access point receives and may store data targeted for the device while the device is in the power save mode. The access point determines whether to notify the device of the data based on one or more thresholds. In other words, if the amount of data is below a first threshold, then the access point does not indicate to the device that the access point has data targeted for the device. For example, the access point may issue a notification frame that falsely indicates to the device that the access point does not have data targeted for the device. Thus, the device remains in power save mode.

Figure 1:
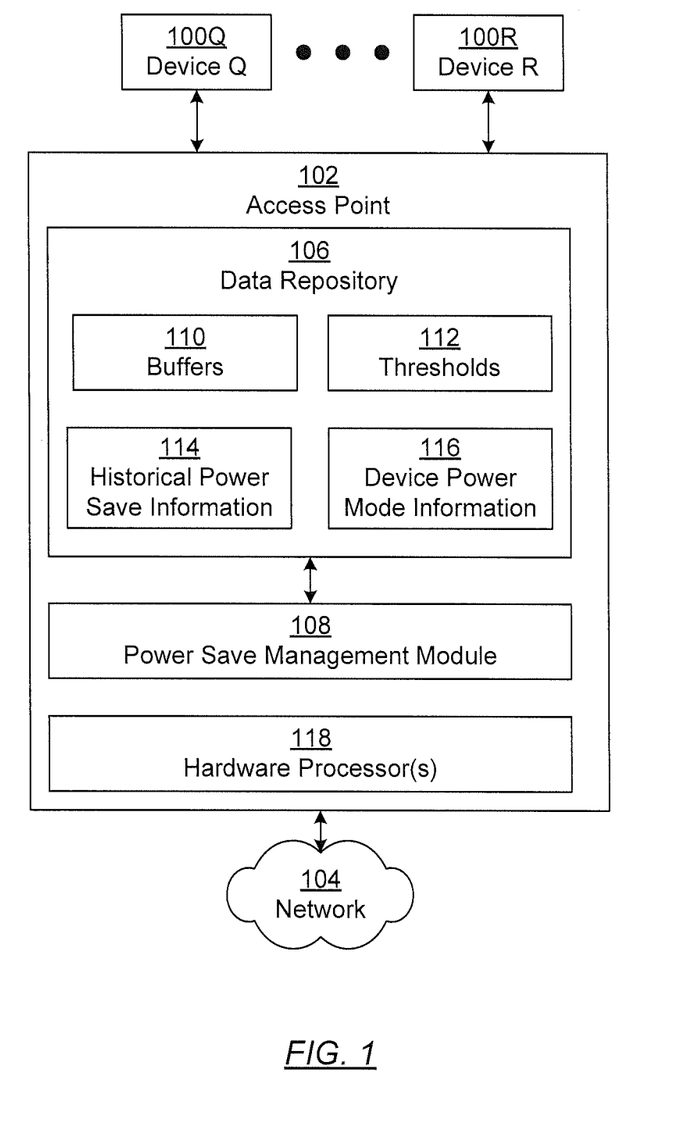
FIGS. 1 and 2 show a schematic diagram of a system in accordance with one or more embodiments.

FIG. 1 shows a schematic diagram of a system in accordance with one or more embodiments. As shown in FIG. 1, the system includes one or more device(s) (e.g., device Q (100Q), device R (100R)) and an access point (102). Both of these components are discussed below.

A device (e.g., device Q (100Q), device R (100R)) is any type of computing system in accordance with one or more embodiments. For example, the device may be one or more mobile devices (e.g., laptop computer, smart phone, personal digital assistant, tablet computer, or other mobile device), desktop computers, servers, blades in a server chassis, network device, or any other type of computing device or devices that includes at least the minimum processing power, memory, and input and output device(s) to perform one or more embodiments. By way of an example, the device may be a client device and/or a station. For example, the device may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores, or micro-cores of a processor.

The device (e.g., device Q (100Q), device R (100R)) includes functionality to transition between different power modes. A power mode defines the target amount of power consumption used by device in accordance with one or more embodiments. For example, in a high performance power mode, the device may operate with processors over-clocked, network interfaces sending and receiving data frames, etc. In a power save mode, the device (e.g., device Q (100Q), device R (100R)) may operate with components of the device at a minimum level of utilization in order to conserve power. In one or more embodiments, the power save mode is the power save mode of 802.11. In other words, the device may have processors in sleep mode and only check for data frames intermittently.

The device (e.g., device Q (100Q), device R (100R)) may be connected to a network (104) via a network interface connection (not shown) and an access point (102). The network (104) may be a local area network (LAN), a wide area network (WAN) such as the Internet, mobile network, or any other type of network, or a combination of networks.

An access point (102) is a digital hardware device that may be communicatively coupled to the network (104). The access point (102) is a separate hardware unit from device (e.g., device Q (100Q), device R (100R)), that is capable of being directly, wired or wirelessly, connected to the device (e.g., device Q (100Q), device R (100R)) and is capable of being in a communication path from the device to the network (104). In other words, the access point may be directly connected via the direct wired/wireless connection to a network interface card on the device (e.g., device Q (100Q), device R (100R)). Further, access points may be directly connected to the network (104) or connected via a controller. By way of an example, the access point may include a wireless access point (WAP) that communicates wirelessly with devices using Wi-Fi, Bluetooth or related standards and that communicates with a wired network. Further, the access point (102) may include one or more hardware processor(s) (118), associated memory (e.g., random access memory (RAM), cache memory, flash memory, etc.) (not shown), one or more storage device(s) (e.g., a hard disk, an optical drive such as a compact disk (CD) drive or digital versatile disk (DVD) drive, a flash memory stick, etc.)(not shown), and numerous other elements and functionalities.

Each access point may be connected to any number of devices at any moment in time. Specifically, each access point may be connected to no devices, a single device, or multiple devices at any particular moment in time. Further, the number of devices connected to an access point may be heterogeneous amongst access points.

An access point (102) is an associated access point when the access point is directly, wired or wirelessly, connected to the device (e.g., device Q (100Q), device R (100R)) and is in a communication path from the device (e.g., device Q (100Q), device R (100R)) to the network (104). In other words, a device (e.g., device Q (100Q), device R (100R)) associates with an access point (102) to connect to the network (104).

The access point includes a data repository (e.g., device Q (100Q), device R (100R)) and a power save management module (108). Both of these components are described below.

In one or more embodiments, the data repository (106) is any type of storage unit and/or device (e.g., a file system, database, collection of tables, or any other storage mechanism) for storing data. Further, the data repository (106) may include multiple different storage units and/or devices. The multiple different storage units and/or devices may or may not be of the same type or located at the same physical site. The data repository (106) includes functionality to store buffers (110), thresholds (112), historical power save information (114), device power mode information (116).

A buffer is a storage location for data directed to a device. Each device may have one or more corresponding buffers. For example, a device may have a single corresponding buffer for all data directed to the device. Alternatively or additionally, a device may have several corresponding buffers. For example, each buffer may correspond to an access category, such as an enhanced distributed channel access (EDCA) access category. By way of a more specific example of buffers corresponding to EDCA access categories, an individual buffer may exist for video data, an individual buffer may exist for voice data, an individual buffer may exist for background data, and an individual buffer may exist for best effort data. By way of another example, two or more of the EDCA access categories may share a single buffer. For example, a single individual buffer may exist for both background data and best effort data.

As shown, the data repository (106) may have multiple buffers, whereby one or more buffers may exist for each device. The various individual buffers may correspond to a virtual storage structure that map to physical storage on the access point. In particular, physical storage allocated to the various buffers may be separate, connected, or interleaved, such that data for one device or one access category may be intermixed in data for another device and/or another access category.

Continuing with FIG. 1, the data repository may include functionality to store thresholds. A threshold is a numerical value that defines when to switch between different notification schemes for notifying a client. For example, a threshold may correspond to a number of bytes, a number of frames, a number of packets or another unit of measuring an amount of data. The same set or a different set of one or more thresholds may exist for each buffer. For example, an individual set of thresholds may exist per device, per buffer per device, or per buffer type.

Figure 2:
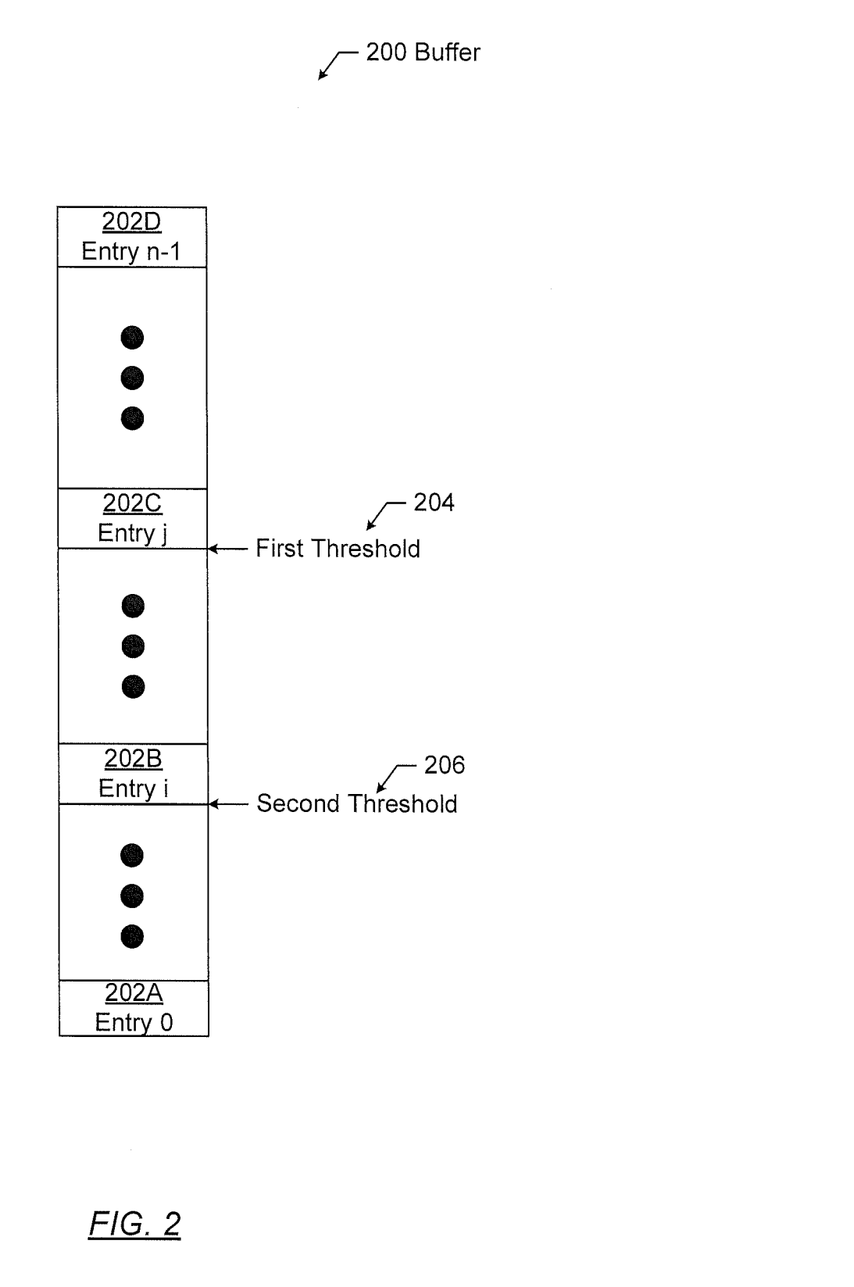

FIG. 2 shows a schematic diagram of a buffer (200) and thresholds in accordance with one or more embodiments. As shown in FIG. 2, the buffer includes multiple entries (e.g., entry 0 (202A), entry i (202B), entry j (202C), entry n−1 (202D)). Each entry (e.g., entry 0 (202A), entry i (202B), entry j (202C), entry n−1 (202D)) includes functionality to store a frame or packet of data that is targeted for the device. Entries may be the same size or a variety of sizes.

In one or more embodiments, a first threshold (204) and a second threshold (206) may be defined. Fewer or more thresholds may exist than the thresholds shown in FIG. 2 without departing from the scope of one or more embodiments. The second threshold (206) may define when to notify a device that any data is in the buffer and for the device. For example, when the amount of data is less than the second threshold, then the device may be notified regardless of the amount of data. The first threshold (204) may define when to notify a device of data based on at least the first threshold amount of data being stored in the buffer (200). In other words, below the first threshold (204), the device may be falsely notified that no data is stored for the device even though the buffer (200) includes some data for the device.

By way of an example storage and notification scheme, when the amount of data stored for the device is below the second threshold (206), the device may be notified that at least some data exists for the device. Continuing with the example, when the amount of data stored in the buffer is between the second threshold (206) and the first threshold (204), the device may be falsely notified that no data is being stored for the device. In the example, when the amount of data is greater than the first threshold (204), then the device may be correctly notified that data is stored for the device. Different storage and notification schemes may exist without departing from the scope of one or more embodiments.

Returning to FIG. 1, the data repository (106) further includes functionality to store historical power save information (114). Historical power save information (114) corresponds to how the device managed power save mode when the device was previously in power save mode. For example, the historical power save information (114) may correspond to the frequency at which the device is checking for data at the access point.

In one or more embodiments, device power mode information (116) is a data structure that identifies whether a device is in power save mode. For example, device power mode information (116) may associate a unique device identifier with an indication of whether a device is in power save mode. For example, the unique device identifier may be an association identifier of the device when the device associates with the access point (102), a media access control (MAC) address of the device, or another unique identifier of the device. The device power mode information may be a list of unique device identifiers of device in power save mode, a bit map whereby each bit corresponds to a device and the corresponding bit is set when the device is in power save mode, or another data structure.

The data repository (106) is operatively connected to a power save management module (108). The power save management module (108) may correspond to hardware, software, firmware, or a combination thereof. The power save management module (108) includes functionality to manage the notification of devices based on the power save mode of the devices, the amount of data in the buffer, and the threshold. In one or more embodiments, the power save management module (108) may implement a polling based scheme, a beacon based scheme, another scheme, or a combination of schemes for power management. In the polling based scheme, the power save management module (108) waits until receiving a polling request from the device to notify the device of the existence or non-existence of data in the buffer. In the beacon based scheme, the power save management module (108) periodically issues a beacon frame that indicates to the device whether the device has data in the buffer. A beacon may be frame to all devices connected to the access point (102) that indicates whether the access point (102) has data for the device. Thus, at the same interval as the beacon, the device may check for the beacon.

Although not shown in FIG. 1, the access point may further include memory, one or more processors, not shown, and other hardware components to perform various embodiments. Further, software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform various embodiments.

While FIG. 1 shows a configuration of components, other configurations may be used without departing from the scope of one or more embodiments. For example, various components may be combined to create a single component. As another example, the functionality performed by a single component may be performed by two or more components.

Figure 3:
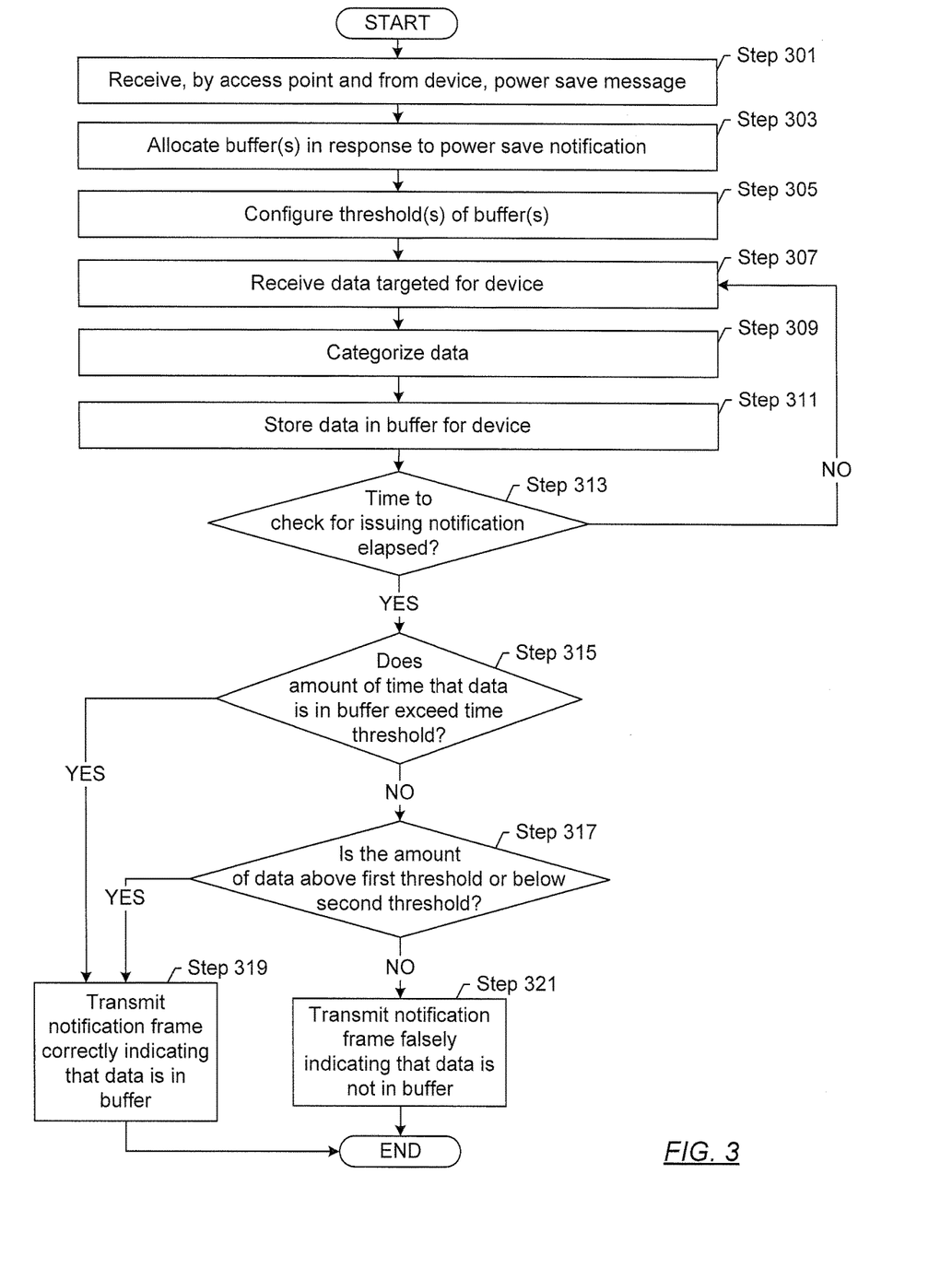
FIG. 3 shows a flowchart in accordance with one or more embodiments.

FIG. 3 shows a flowchart in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

In Step 301, an access point receives a power save message from a device in accordance with one or more embodiments. The power save message may be any notification to the access point that the device is in power save mode. Further, the power save message may be sent directly or indirectly to the access point.

In Step 303, one or more buffers are allocated in response to the power save message in accordance with one or more embodiments. The number of buffers allocated to the device may be pre-configured or configured as part of the power save message. For example, the device may identify, in the power save message or when associating with the access point, the number buffers that should be allocated to the device. The identification may be a number, a set of categories, whereby a buffer should be created for each category, or another form of identification. Further, in one or more embodiments, a default number of buffers and size of each buffer may be allocated. The default number and/or size may be for all devices or based on one or more characteristics of the device, such as priority level of the device, type of device, amount of data directed to device, category of data directed to the device, and other characteristics.

Additionally or alternatively, the size of the buffer(s) may be dependent on other devices associated with or historically associated with the access point. Specifically, the size of the allocated buffer(s) may be set to ensure that sufficient buffer space exists for any devices that may enter power save mode. For example, the size may be dependent on one or more factors, such as the number of devices currently associated with the access point, the number of devices that are currently in power save mode, a historical number of devices associated with the access point and/or in power save mode, current percentage of devices associated with the access point in power save mode, historical percentage of devices associated with the access point in power save mode, and other factors.

The buffer(s) may be allocated when the message is received that a device is in power save mode, when data directed to a device in power save mode is received, or pre-allocated, such as when the device associates with the access point. Further, although FIG. 3 shows allocating the buffers once, the size of the buffers may be adjusted as new devices are associated with the access point, provide a power save message to the access point, and/or at another time.

In Step 305, the threshold(s) of the buffer(s) are configured in accordance with one or more embodiments. The threshold(s) for the buffer(s) may be pre-configured or configured as part of the power save message. For example, the device may identify, in the power save message or when associating with the access point, the threshold(s) that should be set for the buffers. Further, in one or more embodiments, a default set of one or more thresholds of each buffer may be allocated. The default threshold(s) may be for all devices or based on one or more characteristics of the device, such as priority level of the device, type of device, amount of data directed to device, category of data generally directed to the device, and other characteristics. Additionally or alternatively, the thresholds may be set based on historical power save information for the device, such as a measurement of the aggressiveness in which the device is in power save mode. For example, if in previous power save mode times, the device polled more frequently indicating a less aggressive power save, then the one or more thresholds may be set to decrease the amount of data stored for the device.

By way of another example, if in previous power save mode times, the device polled less frequently indicating a more aggressive power save, then the one or more thresholds may be set to increase the amount of data stored for the device. Thus, the setting of the threshold(s) may be performed such that the amount of data stored inversely proportional to the aggressiveness of the stored data.

Additionally or alternatively, the threshold of the buffer(s) may be dependent on other devices associated with or historically associated with the access point. Specifically, similar to size, the threshold of the allocated buffer(s) may be set to ensure that sufficient buffer space exists for any devices that may enter power save mode. If more devices are in power save mode or expected to be in power save mode, then the threshold(s) may be set to limit the amount of data that is stored for the device. For example, the first threshold may be set to a lower value, the second threshold may be set to a higher value, the difference between the first threshold and second threshold may be decreased, and other settings may be performed. Conversely, if fewer devices are in power save mode or expected to be in power save mode, then the threshold(s) may be set to increase the amount of data that is stored for the device and assist the device to remain in power save mode. For example, the first threshold may be set to a higher value, the second threshold may be set to a lower value, the difference between the first threshold and second threshold may be increased, and other settings may be performed.

For example, the threshold may be dependent on one or more factors, such as the number of devices currently associated with the access point, the number of devices that are currently in power save mode, a historical number of devices associated with the access point and/or in power save mode, current percentage of devices associated with the access point in power save mode, historical percentage of devices associated with the access point in power save mode, and other factors.

The threshold(s) may be set when the message is received that a device is in power save mode, when data directed to a device in power save mode is received, or pre-allocated, such as when the device associates with the access point. Further, although FIG. 3 shows setting the thresholds once, the threshold of the buffers may be adjusted as new devices are associated with the access point, provide a power save message to the access point, and/or at another time. Other techniques for allocating buffers and determining thresholds may be used without departing from the scope of one or more embodiments. Further, the thresholds may be set according to a rate threshold. The rate threshold measures the rate or frequency of receiving data target for a device.

Continuing with FIG. 3, in Step 307, data targeted for the device is received in accordance with one or more embodiments. Specifically, the access point receives data from the network that is targeted for the device. In response, the access point checks the device power mode information to determine whether the device is in power save mode. If the device is not in power save mode, then the data is passed to the device in accordance with standard protocols. If the device is in power save mode, then the method may continue.

In Step 309, the data is categorized in accordance with one or more embodiments. For example, the data may be categorized into an EDCA access category. Step 309 may be performed when multiple buffers exist that are dependent on the category of the data. If only a single buffer is used for the device, then Step 309 may be omitted in accordance with one or more embodiments.

In Step 311, the data directed to the device is stored in the buffer for the device in accordance with one or more embodiments. In particular, the data is stored in an entry in the corresponding buffer for the device. If the device has multiple corresponding buffers at the access point, then the buffer in which the data is stored corresponds to the category determined in Step 309.

In Step 313, a determination is made whether the time to check for issuing the notification elapsed in accordance with one or more embodiments. In particular, the check for whether to issue a notification may be intermittent. In one or more embodiments, rather than issuing a notification immediately when new data is received for a device in power save mode, a check is performed to determine whether a notification may be issued regardless of the amount of data in the buffer. Checking for issuing a notification may be based on an interval or occasionally. For example, if a beacon technique is used, then the access point may have an interval by which the access point issues a beacon frame that may or may not indicate data exists for the device. If a polling technique is used, then time elapsed for checking whether to issue the notification may be at the time that the device polls the access point for data. If the time to check has not elapsed, then the access point continues to store, in the buffer(s) for the device, any received data that is directed to the device.

If the time to check for issuing a notification has elapsed, then a determination is made whether the amount of time that the data is in the buffer exceeds a time threshold in Step 315. In one or more embodiments, in order to ensure that data does not remain in the buffer too long, the buffer may be associated with a maximum time at which a notification should be issued regardless of the amount of data and the thresholds. The amount of time may be based on the oldest data in the buffer, the newest data in the buffer, or the average amount of time. The time threshold may be set by default for the buffer or category of buffer, and/or configured for the specific buffer.

If the amount of time the data is in the buffer exceeds a time threshold, then a notification frame is transmitted to the device, which correctly indicates that data is in the buffer in Step 319 in accordance with one or more embodiments.

In one or more embodiments, if a polling technique is used, then the notification may be a response to the device with the data or with an indication that data is available. In one or more embodiments, if a beacon technique is issued, then the beacon frame is created that indicates that data exists for the device. For example, the device identifier in the beacon frame may be set to show that data is available for the device. The beacon frame with the indication is transmitted to the device. If the device checks the beacon frame when the beacon frame is transmitted, then the device is notified that data is available for the device.

In one or more embodiments, a notification frame refers to a IEEE 802.11 beacon frame. The beacon frame wirelessly transmitted by an access point to a client device indicates whether or not data is buffered at the access point for the client device. A client device stores information indicating the interval at which a beacon frame is sent before entering a power save mode in which the client device does not receive wireless signals. The client device is configured to wake up periodically from the power save mode per the beacon frame transmission schedule. The client device may be configured to wake up for each and every beacon frame, or for a subset of the beacon frames. Upon waking up from a power-save mode and receiving the beacon frame, the client device determines if the received beacon frame indicates that data is buffered for the client device at the access point. If data is buffered for the client device, the client device stays awake to obtain the data. If the received beacon frame indicates that data is not available for the client device, the client device returns to the power save mode. In one example, a beacon frame includes a bit that is set of 1 if data is buffered for the client device and set to 0 if data is not buffered for the client device. One or more embodiments described herein relate to setting the bit in a beacon frame to 0 even when data is available for the client device so that the client device returns to a power save mode. In one example, a threshold amount of data or a threshold amount of time since buffering the data is used as a trigger for setting the bit in the beacon frame to 1 to indicate that data is buffered for the client device.

In response, the device may switch from power save mode. Further, the device may respond requesting the data. In some embodiments, the device may specify the amount of data to provide to the device. For example, the device may request that not all data in the buffer is transmitted to the device, but rather only a subset of data is transmitted to the device. In such a scenario, only the subset of the data is transmitted to the device. The remaining data is remains in the buffer(s). Data that is transmitted to the device is removed from the buffer(s).

In one or more embodiments, when the device requests data, the data is transmitted from all buffers regardless of the amount of data and thresholds. Alternatively or additionally, data may be only transmitted from the buffer(s) that triggered the notification frame correctly indicating that data is in the buffer.

Returning to Step 315, if the amount of time that data is in the buffer does not exceed the time threshold, then a determination is made whether the amount of data is above the first threshold or below the second threshold in Step 317 in accordance with one or more embodiments. In other words, the data is compared to one or more thresholds to determine whether the amount of data complies with the limits set by the one or more thresholds to indicate that data is available in the buffer.

If the thresholds and amount of data indicate that a notification should be issued, then a notification frame, which correctly indicates that data is in the buffer, is transmitted in Step 319 in accordance with one or more embodiments. Transmitting the notification may be performed as discussed above.

However, if the thresholds and the amount of data do not indicate that a notification should be issued, then a notification frame is transmitted that falsely indicates that data is not in the buffer in Step 321. Transmitting the notification frame may be performed as discussed above and in Step 319. However, rather than correctly indicating that data is in a buffer, the notification frame incorrectly indicates that no data is in the buffer. In other words, if a polling technique is used, the access point responds with no data is available. If a beacon technique is used, the access point responds with a beacon frame that does not have the beacon corresponding to the device set. Thus, the device remains in power save mode regardless that data is available in the buffer.

In FIG. 3, if the device has multiple corresponding buffers at the access point, the notification frame may notify the device that data is in the buffer if any of the thresholds and any of the amounts of data in the buffers indicate to notify the device that data is available. For example, consider the scenario in which the amount of data in a video data buffer and corresponding threshold(s) indicate to transmit the notification frame falsely indicating that no data is available while the amount of data in a voice data buffer and corresponding threshold(s) indicate to transmit the notification frame correctly indicating that data is available. In such a scenario, the access point may issue a notification frame correctly indicating that data is available in the buffer and the device may obtain data from both buffers.

In FIG. 3, data is stored in the buffer when issuing a notification frame in accordance with one or more embodiments. If no data is in the buffer, then the notification frame correctly indicates that no data is in the buffer.

Figure 4:
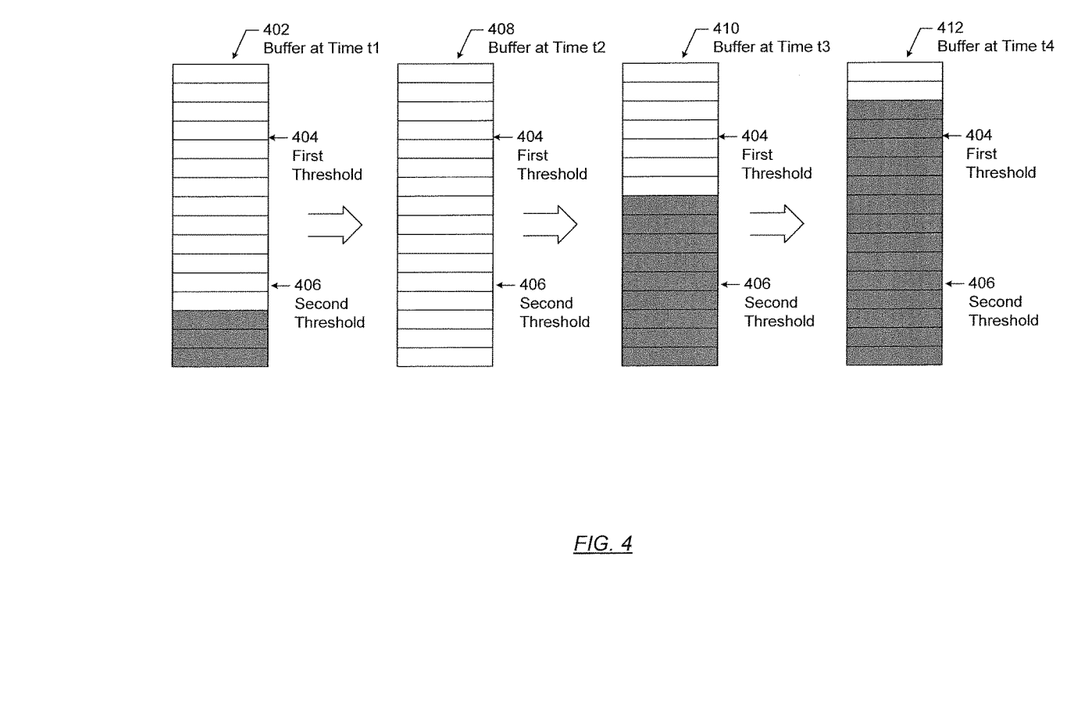
FIG. 4 shows an example in accordance with one or more embodiments.

FIG. 4 shows an example in accordance with one or more embodiments. The following example is for explanatory purposes only and not intended to limit the scope of one or more embodiments. In the example, a device is wirelessly connected to an access point and is in power save mode. FIG. 4 shows a schematic diagram of a buffer at four different times (e.g., buffer at time t1 (402), buffer at time t2 (408), buffer at time t3 (410), buffer at time t4 (412)). Each time corresponds to a time in which the access point (not shown) may check to determine whether to issue a notification frame correctly or incorrectly indicating that data exists for the device. The buffers shown in FIG. 4 include multiple entries. Shaded entries correspond to entries that have data while white entries correspond to entries that are empty.

Initially (not shown), the buffer is empty. At time t1, when the first check is performed, only three entries have data as shown in the buffer at time t1 (402). As shown by the shading, the amount of data in the buffer is less than the second threshold (406) at time t1. Thus, the notification frame is issued that correctly indicates that data is available for the device. In response to the notification frame, the device switches from power save mode and obtains data from the buffer.

At time t2, when the second check is performed, the buffer is still empty as shown in the buffer at time t2 (408). As shown by the shading, the buffer is empty at time t2. In other words, the access point has not received data for the buffer between time t1 and time t2. Thus, the notification frame is issued that correctly indicates that no data is available for the device.

At time t3, when the third check is performed, as shown by the shading, the amount of data in the buffer is less than the first threshold (404) and the second threshold (406) as shown in the buffer at time t3 (410). Thus, the notification frame is issued that falsely indicates that no data is available for the device. In other words, notification frame indicates that the buffer does not have data available even though data is in the buffer. In response to the notification frame, the device remains in power save mode.

At time t4, when the fourth check is performed, as shown by the shading, the amount of data in the buffer is greater than the first threshold (404) and the second threshold (406) as shown in the buffer at time t4 (412). Thus, the notification frame is issued that correctly indicates that data is available for the device. In response to the notification frame, the device switches from power save mode and obtains data from the buffer. Thus, at the end of time t4, the buffer is empty.

As shown in the example, the frequency in which data is received may dictate whether the notification frame correctly or incorrect indicates that data is available for the device. For example, while the frequency in which data is received is such that the amount of data is below the second threshold, then the notification frames may correctly indicate whether data is available. However, if the frequency increases such that the amount of data is between the first and second threshold, then the notification frame may falsely indicate that no data is available until the amount of data is greater than the first threshold. Thus, the device may remain in power save mode.

While the invention has been described with respect to a limited number of embodiments, those skilled in the art, having benefit of this disclosure, will appreciate that other embodiments can be devised which do not depart from the scope of one or more embodiments as disclosed herein. Accordingly, the scope should be limited only by the attached claims.

What is claimed is:

1. A non-transitory computer readable medium comprising instructions, when executed by a processor to:
   receive, at an access point, data targeted for a device;
   determine whether an amount of the data targeted for the device is below a first threshold and above a second threshold, wherein the second threshold is below the first threshold; and
   transmit a first notification frame, wherein:
      the first notification frame falsely indicates that the access point does not have the data targeted for the device responsive at least to determining that the amount of data is below the first threshold and above the second threshold; and
      the first notification frame correctly indicates that the access point has the data targeted for the device responsive at least to determining that the amount of data is below the second threshold or above the first threshold.

2. The non-transitory computer readable medium of claim 1, wherein the instructions to determine whether the amount of the data targeted for the device is below the first threshold comprises instructions to determine whether a number of packets targeted for the device is below the first threshold.

3. The non-transitory computer readable medium of claim 1, comprising instructions to transmit the first notification frame falsely indicating that the access point does not have data targeted for the device is based on a rate of receiving the data targeted for the device being above a rate threshold.

4. The non-transitory computer readable medium of claim 3, wherein the rate threshold is based on an enhanced distribute channel access (EDCA) access category associated with the data.

5. The non-transitory computer readable medium of claim 1, wherein the first threshold is based on an EDCA access category associated with the data.

6. The non-transitory computer readable medium of claim 1, comprising instructions to:
   adjust a difference between the first threshold and the second threshold to be decreased responsive to an increased number of devices associated with the access point and that are in or expected to be in a power save mode; and
   adjust a difference between the first threshold and the second threshold to be increased responsive to a decreased number of devices associated with the access point and that are in or expected to be in the power save mode.

7. The non-transitory computer readable medium of claim 1, further comprising instructions to:
   subsequent to the transmission of the first notification frame falsely indicating that the access point does not have data targeted for the device:
      determine that an amount of time subsequent to receiving at least a portion of the data exceeds a particular time threshold; and
      responsive to the determination that the amount of time exceeds the particular time threshold, transmit a second notification frame correctly indicating that the access point has the data targeted for the device exceeds the first threshold.

8. The non-transitory computer readable medium of claim 1, wherein the first threshold is based on an aggregated amount of data buffered at the access point that is targeted for a plurality of devices.

9. The non-transitory computer readable medium of claim 1, wherein the first threshold is based on a number of devices, associated with the access point, currently operating in a power save mode.

10. The non-transitory computer readable medium of claim 1, wherein the instructions to the determine operation and the transmitting operation are performed at least in response to a receipt of a message from the device indicating that the device is entering a power save mode.

11. A system comprising:
    an access point including a hardware processor;
    the system to perform operations comprising:
       receiving, at the access point, data targeted for a device;
       determining whether an amount of the data targeted for the device is below a first threshold; and
       responsive a least to determining that the amount of data is below the first threshold, transmitting a first notification frame falsely indicating that the access point does not have the data targeted for the device, wherein:
          the first threshold is adjusted to be decreased responsive to an increased frequency with which the device polls the access point for the data targeted for the device; and
          the first threshold is adjusted to be increased responsive to an decreased frequency with which the device polls the access point for the data targeted for the device.

12. The system of claim 11, wherein the operations further comprise: determining whether the amount of the data targeted for the device is above the first threshold, responsive at least to determining that the amount of data is above the first threshold, transmitting the first notification frame correctly indicating that the access point has the data targeted for the device.

13. The system of claim 11, wherein determining whether the amount of the data targeted for the device is below the first threshold comprises determining whether a number of packets targeted for the device is below the first threshold.

14. The system of claim 11, wherein transmitting the first notification frame falsely indicating that the access point does not have data targeted for the device is based on a rate of receiving the data targeted for the device being above a rate threshold.

15. The system of claim 14, wherein the rate threshold is based on an enhanced distributed channel access (EDCA) access category associated with the data.

16. The system of claim 11, wherein the first threshold is based on a EDCA access category associated with the data.

17. The system of claim 11, wherein the operations further comprise:
    subsequent to transmitting the first notification frame falsely indicating that the access point does not have the data targeted for the device:
       determining that an amount of time subsequent to receiving at least a portion of the data exceeds a particular time threshold; and responsive to determining that the amount of time exceeds the particular time threshold: transmitting a second notification frame correctly indicating that the access point has the data targeted for the device regardless of whether the data targeted for the device exceeds the first threshold.

18. The system of claim 11, wherein the first threshold is based on an aggregated amount of data buffered at the access point.

19. The system of claim 13, wherein:
the first threshold is set to a lower value responsive to an increased number of devices, associated with the access point, currently operating in a power save mode; and
the first threshold is set to a higher value responsive to a decreased number of devices, associated with the access point, currently operating in the power save mode.

20. The system of claim 11, wherein the determining operation and the transmitting operation are performed at least in response to receiving a message from the device indicating that the device is entering a power save mode.

21. The system of claim 11, wherein the first threshold is set when the data targeted for the device is received at the access point while the device is in a power save mode.

22. The system of claim 17, wherein the particular time threshold is based on an amount of time that data targeted for each device associated with the access point is stored in the access point.

* * * * *